(12) United States Patent
Katiyar et al.

(10) Patent No.: US 9,240,937 B2
(45) Date of Patent: Jan. 19, 2016

(54) FAULT DETECTION AND RECOVERY AS A SERVICE

(75) Inventors: Atul Katiyar, Redmond, WA (US); Chinna Babu Polinati, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 13/076,963

(22) Filed: Mar. 31, 2011

(65) Prior Publication Data

US 2012/0254652 A1    Oct. 4, 2012

(51) Int. Cl.
| | |
|---|---|
| *G06F 11/00* | (2006.01) |
| *H04L 12/26* | (2006.01) |
| *H04L 12/24* | (2006.01) |
| *G06F 11/14* | (2006.01) |
| *G06F 11/20* | (2006.01) |
| *G06F 11/30* | (2006.01) |
| *G06F 11/07* | (2006.01) |

(52) U.S. Cl.
CPC ............ *H04L 43/12* (2013.01); *G06F 11/0751* (2013.01); *G06F 11/1438* (2013.01); *G06F 11/203* (2013.01); *G06F 11/2028* (2013.01); *G06F 11/3006* (2013.01); *H04L 41/0695* (2013.01); *G06F 11/2025* (2013.01); *G06F 11/2035* (2013.01); *G06F 11/3055* (2013.01)

(58) Field of Classification Search
USPC .......................................................... 714/15
See application file for complete search history.

(56) References Cited

U.S. PATENT DOCUMENTS 6,633,538 B1 * 10/2003 Tanaka et al. ................. 370/222
6,718,486 B1 *  4/2004 Roselli et al. ................... 714/41
(Continued)

FOREIGN PATENT DOCUMENTS

| EP | 0974903 A2 | 2/2000 |
| WO | 03/073205 A2 | 9/2003 |

OTHER PUBLICATIONS

Deng; et al., "Fault-Tolerant and Reliable Computation in Cloud Computing"—Published Date: Aug. 25, 2010 http://www.uncg.edu/cmp/faculty/j_deng/papers/cloud_wps10.pdf.
(Continued)

*Primary Examiner* — Kamini Patel
(74) *Attorney, Agent, or Firm* — Bryan Webster; Katherine Drakos; Micky Minhas

(57) ABSTRACT

The monitoring by a monitoring node of a process performed by a monitored node is often devised as a tightly coupled interaction, but such coupling may reduce the re-use of monitoring resources and processes and increase the administrative complexity of the monitoring scenario. Instead, fault detection and recovery may be designed as a non-proprietary service, wherein a set of monitored nodes, together performing a set of processes, may register for monitoring by a set of monitoring nodes. In the event of a failure of a process, or of an entire monitored node, the monitoring nodes may collaborate to initiate a restart of the processes on the same or a substitute monitored node (possibly in the state last reported by the respective processes). Additionally, failure of a monitoring node may be detected, and all monitored nodes assigned to the failed monitoring node may be reassigned to a substitute monitoring node.

20 Claims, 8 Drawing Sheets

(56) References Cited

U.S. PATENT DOCUMENTS

| | | | |
|---|---|---|---|
| 6,795,940 B2* | 9/2004 | Goto | 714/42 |
| 6,918,051 B2* | 7/2005 | Block et al. | 714/4.11 |
| 6,925,582 B2* | 8/2005 | Miller et al. | 714/25 |
| 6,952,766 B2* | 10/2005 | Dervin et al. | 713/2 |
| 6,973,643 B2* | 12/2005 | Goldsmith et al. | 717/124 |
| 7,058,629 B1* | 6/2006 | Colrain et al. | 710/200 |
| 7,069,317 B1* | 6/2006 | Colrain et al. | 709/224 |
| 7,181,523 B2* | 2/2007 | Sim | 709/226 |
| 7,203,868 B1* | 4/2007 | Evoy | 714/39 |
| 7,222,268 B2* | 5/2007 | Zaifman et al. | 714/47.2 |
| 7,475,127 B2* | 1/2009 | Colrain et al. | 709/223 |
| 7,475,274 B2* | 1/2009 | Davidson | 714/4.4 |
| 7,788,544 B2* | 8/2010 | Allen et al. | 714/47.1 |
| 7,823,009 B1* | 10/2010 | Tormasov et al. | 714/6.12 |
| 7,979,862 B2* | 7/2011 | Miller et al. | 718/104 |
| 8,171,474 B2* | 5/2012 | Mankovski | 718/100 |
| 2002/0116151 A1 | 8/2002 | Brown et al. | |
| 2003/0204781 A1* | 10/2003 | Peebles et al. | 714/25 |
| 2009/0077420 A1* | 3/2009 | Sunavala et al. | 714/25 |
| 2009/0313198 A1* | 12/2009 | Kudo et al. | 706/47 |
| 2010/0080141 A1* | 4/2010 | Nakamura | 370/252 |
| 2010/0082809 A1* | 4/2010 | Nakamura | 709/224 |
| 2010/0250755 A1* | 9/2010 | Morris | 709/228 |
| 2010/0250756 A1* | 9/2010 | Morris | 709/228 |
| 2010/0318837 A1* | 12/2010 | Murphy et al. | 714/4 |

OTHER PUBLICATIONS

Schultz, Beth, "How to buy cloud computing services"—Retrieved Date: Jan. 27, 2011 http://www.networkworld.com/supp/2009/ndc3/051809-cloud-buy-services.html.

"Cloud & Delivery"—Retrieved Date: Jan. 27, 2011 http://www.sumtotalsystems.com/solutions/technology-cloud-delivery.html.

Hamidi; et al. "Evaluation and Checkpointing of Fault Tolerant Mobile Agents Execution in Distributed Systems"—Jul. 2010, Journal of Networks, Vo. 5, No. 7, pp. 800-807, http://www.ojs.academypublisher.com/index.php/jnw/article/viewFile/0507800807/1936.

Bheevgade; et al., "Implementation of Watch Dog Timer for Fault Tolerant Computing on Cluster Server"-2008, World Academy of Science, Engineering and Technology, pp. 265-268, http://www.waset.org/journals/waset/v38/v38-46.pdf.

"Accelerate Development and Achieve Flexible, Scalable Applications with Fewer Resources"—Retrieved Date: Jan. 27, 2011, http://www.appistry.com/solutions/isv-saas.

"International Search Report", Mailed Date: Oct. 30, 2012, Application No. PCT/US20121028839, Filed Date: Mar. 12, 2012, pp. 8.

EP Search Report cited in EP Application No. 12764738.6 dated Mar. 24, 2015, 12 pgs.

EP Communication cited in EP Application No. 12764738.6 dated Apr. 13, 2015, 1 pg.

\* cited by examiner

FAULT DETECTION AND RECOVERY AS A SERVICE

BACKGROUND

Within the field of computing, many scenarios involve a detection of a fault in a computer system, such as an interference with a process; an unavailability of a resource utilized by the process, such as an exhaustion of free memory or a resource that is exclusively locked by another process; an inability of a process to complete a task; a logical fault in a process that leads to a consumption of resources, an unending loop, or an application crash; or a failure of the hardware of a device that interrupts the execution of processes. Such faults may range in severity from curiosities to inconveniences to severe problems (e.g., failures in realtime processes or processes upon which users depend for uptime). In these and other scenarios, an administrator may endeavor to monitor the process, such as utilizing a monitoring process operating on the same device or another device to monitor the instrumentation of a monitored process, verify that the monitored process continues to operate as anticipated, provides acceptable performance, and is accessible to users. If the monitored process shows indications of failure or becomes unreachable, the monitoring process may register the indications in a log, or may notify an administrator.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The interface of monitoring processes and monitored processes is often highly specialized and proprietary. For example, a process to be monitored may report a specialized set of metrics indicating its status, and/or may report such metrics in specialized ways, such as a particular type of log or event model or a particular location. The monitoring process may also be specially designed to couple with the monitored process (e.g., to evaluate the log, subscribe to the events, and/or query the monitored process). The monitoring process and monitored process may together represent a tightly coupled pair of interoperating processes. However, the specialization of the monitoring process and the monitored process may be inefficient in some respects. As a first example, each monitored process may have a corresponding monitoring process, and the monitoring of many monitored processes may involve the deployment of many monitoring processes that each monitors one process. This coupling may reduce the re-use of monitoring equipment (e.g., it may be difficult to configure a group of machines to monitor a group of processes). As a second example, it may be uncommon to establish monitoring of a first process that is monitoring a second process (on the same machine or another machine). As a third example, each instance of monitoring may differ in insignificant or significant ways (e.g., the manner of notifying an administrator of failure indicators, the types of failure indicators used by different processes, and the location, format, and semantic use of a log file), leading to increased complexity in the administration of the systems.

Presented herein are techniques for implementing fault monitoring as a standardized service. In accordance with these techniques, a set of one or more monitoring nodes may be provided that are configured to perform the monitoring of various monitored nodes performing one or more processes to be monitored. One or more monitored nodes may register for monitoring with a monitoring node, and may initiate a periodic reporting of the statuses of the processes, possibly including the states of the processes (e.g., not just whether a process is running, but the internal state of the process). The monitoring nodes may record this information, and may take an action upon receiving an indication that a process or a monitored node is encountering difficulty or has stopped reporting. For example, the monitoring node may request a restart of a process that is no longer reporting, including restarting the process at the state last reported by the monitored node, and also may request a restart of the process on a different monitored node. If a monitored node entirely stops responding, the monitoring node may choose a substitute monitored node, and may request a restart of all such processes (possibly in the last reported states) on the substitute monitored node.

Moreover, in scenarios involving a set of two or more monitoring nodes, the monitoring nodes may also monitor each other. For example, monitored nodes may be assigned to report to a particular monitoring node. Moreover, the monitoring nodes may periodically synchronize the monitoring information thereamong (e.g., each monitoring node may inform the other monitoring nodes of the monitored nodes assigned thereto, the monitored processes executed thereupon, and the status and/possibly state of each such monitored process). If a monitoring node fails (e.g., stops reporting to the other monitoring nodes), the other monitoring nodes may choose a substitute monitoring node, to which all of the monitored node of the failed monitoring node may be reassigned.

The implementation of fault detection and fault recovery in accordance with these techniques may present some advantages. As a first example, these techniques may enable fault tolerance to be offered as a non-specialized, non-proprietary, subscription-based service, wherein a set of monitoring nodes may collaborate to monitor any participating process on a set of monitored nodes, irrespective of the type of process that is monitored or the role of the monitored node. As a second example, these techniques may promote efficient use of monitoring resources; for example, a single set of monitoring nodes, executing a small number of monitoring processes, may be configured monitor a large and diverse set of monitored nodes and monitored processes. As a third example, these techniques enable a monitoring node to assume the role of a failed monitoring node (e.g., by adopting the monitored nodes formerly assigned to the failed monitoring node), and a monitored node to assume the role of a failed monitored node (e.g., by restarting the processes performed by the monitored node at the moment of failure). This redundancy and fungibility of nodes may promote high availability by recovering from failures while reducing interruption of the monitored processes and/or monitoring service. As a fourth example, these techniques may promote the scalability of the monitoring service; e.g., monitored nodes and processes may easily register for monitoring, and monitoring capacity may be expanded simply by adding more monitoring nodes. These and other advantages may be achieved through the implementation of monitoring scenarios according to the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
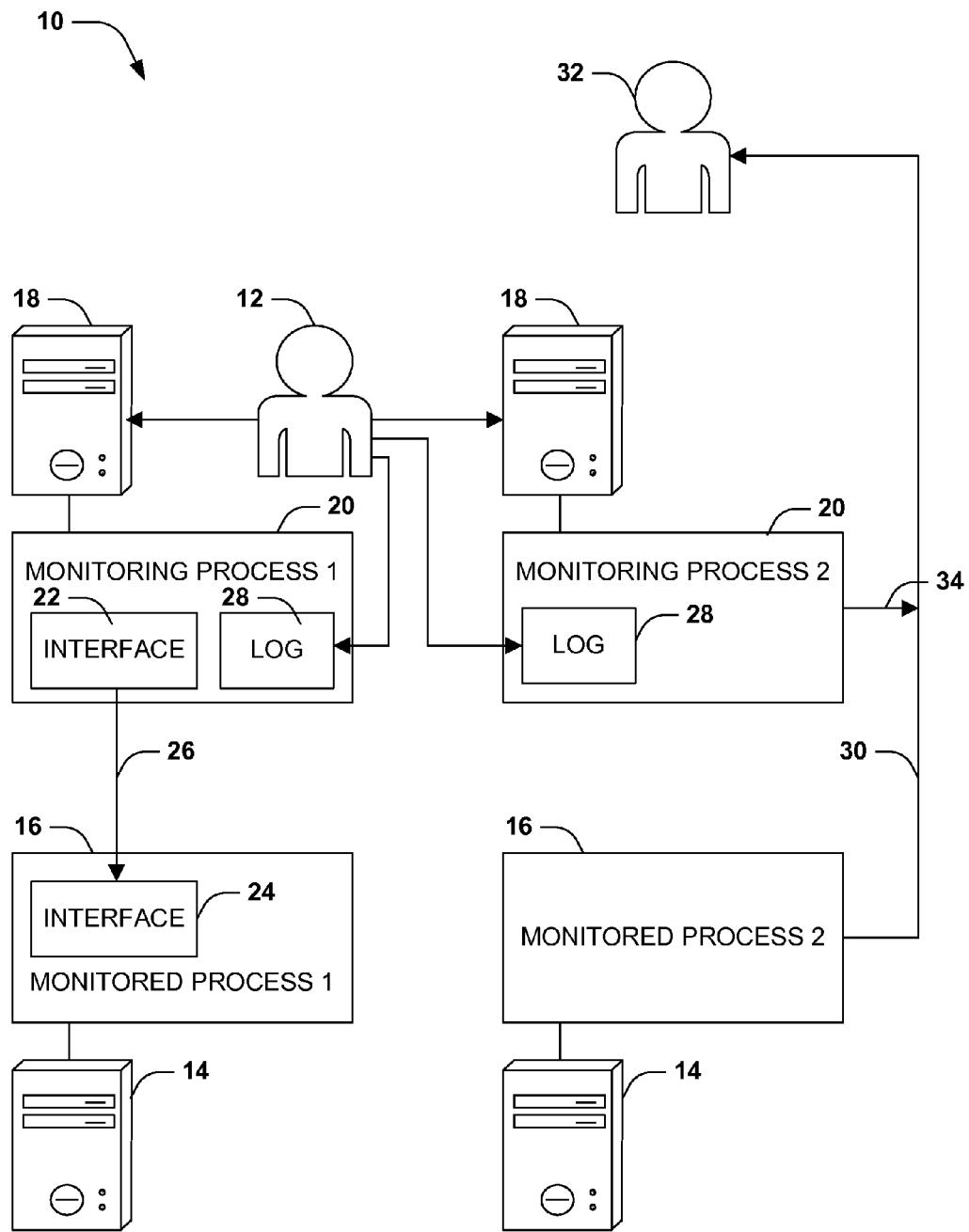
FIG. 1 is an illustration of an exemplary scenario featuring a monitoring of a process performed by a monitored node by a monitoring node.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a monitoring of one or more processes performed by one or more nodes (e.g., various types of devices and computers, and/or simulated operating environments operating thereupon) that are to be monitored in the event of a failure. A process may fail for various reasons (e.g., an interference with a process; an unavailability of a resource utilized by the process, such as an exhaustion of free memory or a resource that is exclusively locked by another process; a failure of a process to complete a task; a logical fault in a process that leads to a consumption of resources, an unending loop, or an application crash). Additionally, an entire node may experience software or hardware failures (e.g., an overheating of the processor, a cessation of power or network access, a hard disk failure, or a crashed operating system). The consequences of such failures may cover a range of severity, such as a curiosity, an inconvenience or frustration, and a severe problem (e.g., a realtime process may execute within a scenario having strict timing parameters, such as a process operating the motions of a robot on an assembly line or a process may be utilized by a large number of other processes, such as a database server that provides data stored in a database to a range of data-driven applications, or a webserver that concurrently receives and generates web pages in response to a large number of requests received from many users).

Within such scenarios, it may be desirable to configure a computer or device executing a process for monitoring by another computer or device. For example, a monitored node executing a particular process may be monitored by a monitoring node, which may periodically detect metrics or receive reports that indicate the status of the monitored node and/or process, such as whether the process and node remain operational and are performing in an acceptable manner. Upon detecting an emerging, imminent, or existing problem, such as a failure of the process or the monitored node, the monitoring node may perform various actions, such as logging the detected information or notifying an administrator for further action.

The monitoring of a process of a monitored node by a monitoring node may be implemented in various ways. FIG. 1 presents an illustration of an exemplary scenario 10 featuring two exemplary techniques for configuring a monitored node 14 and a monitoring node 18 to interoperate to achieve the monitoring of a process 16 performed by the monitoring node 14. In this exemplary scenario 10, a first monitored node 14 performs a first process 16 that is monitored by a first monitoring node 18, and a second monitored node 14 performs a second process 16 that is monitored by a second monitoring node 18. However, the circumstances of the monitoring may significantly differ between these two implementations. For example, the first monitoring process 14 may utilize a first monitoring process 20 comprising a specialized application written to monitor the process 16, and that implements a specialized interface 22 to communicate with a specialized interface 24 of the process 16 (e.g., the monitoring process 20 may receive metrics sent by the specialized interface 24 of the process 16, and/or may query the process 16 through the specialized interface 24 to request status information). The first monitoring process 20 may also write significant information to a first log 28 that may be reviewed by an administrator 12 to determine the status of the monitored node 14 and process 16. The second monitoring process 14 may utilize a second (different) monitoring process 20 comprising a specialized application written to monitor the process 16. However, the process 16 may not be configured to communicate with the monitoring process 20, but may provide a service 30 to a client 32, and the monitoring process 20 may monitor 34 the service 30 of the process 16 with the client 32 (e.g., monitoring the provision of data from the process 16 to the client 32). The second monitoring process 20 may also write significant information to a second (different) log 28 that may be reviewed by an administrator 12 to determine the status of the monitored node 14 and process 16. In this manner, the first monitoring node 18 and the first monitored node 14 may interoperate to achieve the monitoring of the first process 16, and the second monitoring node 18 and the second monitored node 14 may interoperate to achieve the monitoring of the second process 16.

The exemplary scenario 10 of FIG. 1 therefore illustrates a specialized technique for monitoring each process 16, involving a tight coupling of respective monitoring nodes 18 and monitored nodes 16 to achieve the monitoring and reporting of statuses and failures. However, this exemplary scenario 10 also illustrates some disadvantages that may arise with specialized techniques based on such tight coupling. As a first example, each monitoring node 18 performs a monitoring of the corresponding monitored node 14 and process 16, but does not participate in the monitoring of the other monitored node 14 and/or process 16. Therefore, the monitoring nodes 18 may not utilize the resources of one monitored node 14 in the event of a failure of the other monitored node 14. As a second example, the monitoring nodes 18 do not intercommunicate, and a failure of either monitoring node 18 may not be detected or responded to by the other monitoring node 18; indeed, a failure of a monitoring node 18 may not be reported to or noticed by an administrator 12. As a third example, the monitoring nodes 18 report information about the monitoring to the administrator 12 in different ways (e.g., utilizing different logs 28), and the administrator 12 may have to examine each log 28 and attend to the details of the monitoring of each process 16 in turn. As a fourth example, it may be difficult for the administrator 12 to introduce a new process 16 to be monitored, a new monitored node 14 performing a process 16, or a new monitoring node 20 into the exemplary scenario 10, due to the specialization and tight coupling of the resources already included therein. Moreover, the differences in the manner of recording information and reporting failures may reduce the consistency of the reporting process. Rather, the monitoring of a new process 16 and/or monitored node 14 may be achieved only by the introduction of a new monitoring node 18, possibly including a specialized monitoring process 20, thereby further increasing the complexity of the administration of the monitoring in the exemplary scenario 10 of FIG. 1.

Presented herein are techniques for implementing one or more monitoring nodes 18 to monitor one or more processes 16 performed by one or more monitoring nodes 14 in a standardized manner that promotes the interoperation, fault detection and fault recovery capabilities, flexibility, extensibility, and consistency of such monitoring. In accordance with these techniques, a monitoring node 18 may be configured to accept the registration of one more monitored nodes 14, and may performing the monitoring of processes performed thereupon. A monitored node 14 may register with a monitoring node 18 for monitoring, and may indicate one or more processes 16 executing on the monitored nodes 14. The monitored node 14 may then notify the monitoring node 18 of the statuses of the respective processes 16. In the event of a failure of a process 16 (e.g., metrics indicating the development of a problem, a reporting of a failure status, or a cessation of reported statuses), a monitoring node 18 may request that the monitored node 14 restart the process 16. Alternatively, upon detecting the failure of an entire monitored node 14 (e.g., a cessation of reporting from the monitored node 14 or a lack of responsiveness), the monitoring node 18 may select a substitute monitored node 14 from the monitored node set, and may request the substitute monitored node 14 to restart each of the processes 16 that were executing on the monitored node 14 that has failed. Moreover, the monitoring nodes 18 may be configured to monitor each other; e.g., if a monitoring node 18 ceases reporting its status to the other monitoring nodes 18, the other monitoring nodes 18 may collectively choose a substitute monitoring node 18 for the failed monitoring node 18, and may reassign the monitored nodes 14 that had been assigned to the failed monitoring node 18 to the substitute monitoring mode 18.

Figure 2:
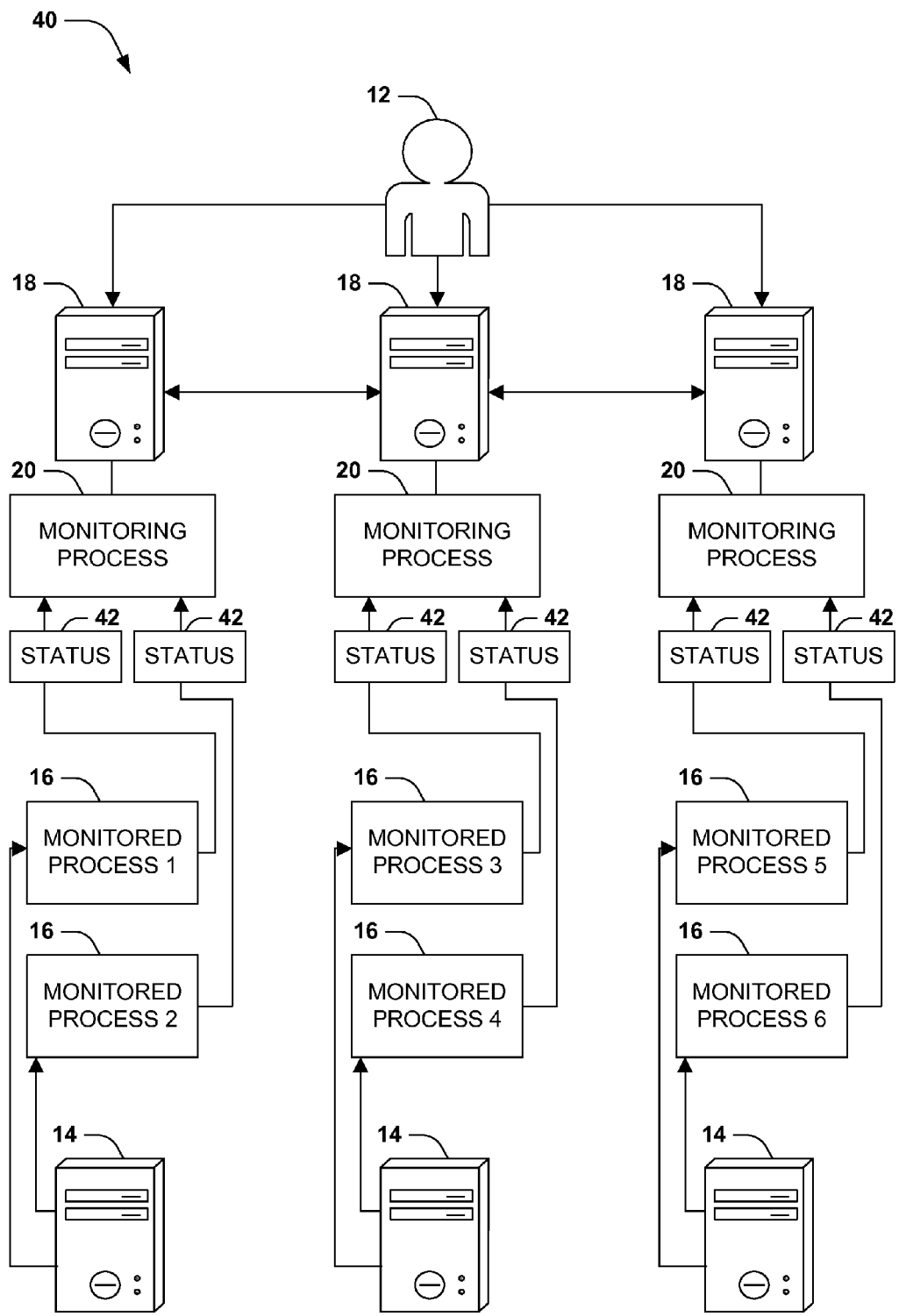
FIG. 2 is an illustration of an exemplary scenario featuring a set of monitoring nodes configured to monitor one or more processes performed by a set of monitored nodes in accordance with the techniques presented herein.

FIG. 2 presents an exemplary scenario 40 featuring a monitoring of a set of processes 16 performed by a set of monitored nodes 14 and monitored by a set of monitoring nodes 18. In this exemplary scenario 40, a set of monitoring nodes 18 interoperates to perform the monitoring of the monitored nodes 14 and processes 16. The monitored nodes 14 may be configured to, upon joining the monitoring scenario, register for monitoring, and the monitoring nodes 18 may confer to choose a monitoring node 18 to which the monitored node 14 is to be assigned. The monitored node 14 may receive a notification of the assignment, and may begin reporting a set of statuses 42 of respective processes 16 to a monitoring process 20 on the monitoring node 18. The monitoring node 18 may therefore determine the status of the monitored node 14 and the processes 16 performed thereby. If a process 16 fails (as indicated by the statuses 42 reported thereto), the monitoring node 18 may request the monitored node 14 to restart the process 16; but if an entire monitored node 14 fails, the monitoring node 18 may confer with the other monitoring nodes 18 choose a substitute monitored node 14, and the processes 16 that had been executing on the failed monitored node 14 may be restarted upon the substitute monitored node 14. Moreover, if a monitoring node 18 fails, the other monitoring nodes 18 may confer to choose a substitute monitoring node, and may reassign all of the monitored nodes 14 that had been assigned to the failed monitoring node 18 to the substitute monitoring node 18. All of these actions may be reviewed by an administrator 12, who may view a log shared by the monitoring nodes 18 and administrate the monitoring network (e.g., expanding the monitoring network by adding more monitored nodes 14, processes 16, and/or monitoring nodes 18).

The techniques presented herein (including in the exemplary scenario 40 of FIG. 2) may present some advantages over other monitoring techniques, such as those illustrated in the exemplary scenario 10 of FIG. 1. As a first example, the techniques presented herein may represent a standardized monitoring framework, whereby any process 16 may participate in the monitoring through the reporting of information to a monitoring node 18. As a second example, the techniques presented herein promote the extensibility of the monitoring scenarios; e.g., additional monitoring nodes 18 may be easily added to the monitoring node set 18 to share the computational load of the monitoring and improve the resiliency thereof, and a monitored node 14 comprising various processes 16 to be monitored may easily join the monitored node set to subscribe for monitoring. Additionally, this monitoring framework may enable monitoring to be offered, provided, and subscribed to as a standardized service; e.g., a monitoring host may offer a set of monitoring nodes 18 to which any set of monitored nodes 14 and processes 16 may be subscribed. As a third example, the fault detection and fault recovery among the processes 16, monitored nodes 14, and monitoring nodes 18 is significantly improved; e.g., a failure of any component may be detected and absorbed by the remaining resources of the monitoring scenario. Moreover, the ease and rapidity of fault recovery through these techniques may enable high availability of both the monitored processes and the monitoring service; e.g., device and process failures may be rapidly detected, and another monitoring node and/or monitored node may assume the role of a failed device. As a fourth example, the consistency of the monitoring scenario may be significantly improved, and the complexity thereof significantly reduced, by configuring the monitoring nodes 18 to record information and report to administrators 12 in a standardized manner. For example, an administrator 12 may view the status of all monitored resources by viewing one log that is shared by all of the monitoring nodes 18. These and other advantages may be achieved through the implementation of monitoring according to the techniques presented herein.

Figure 3:
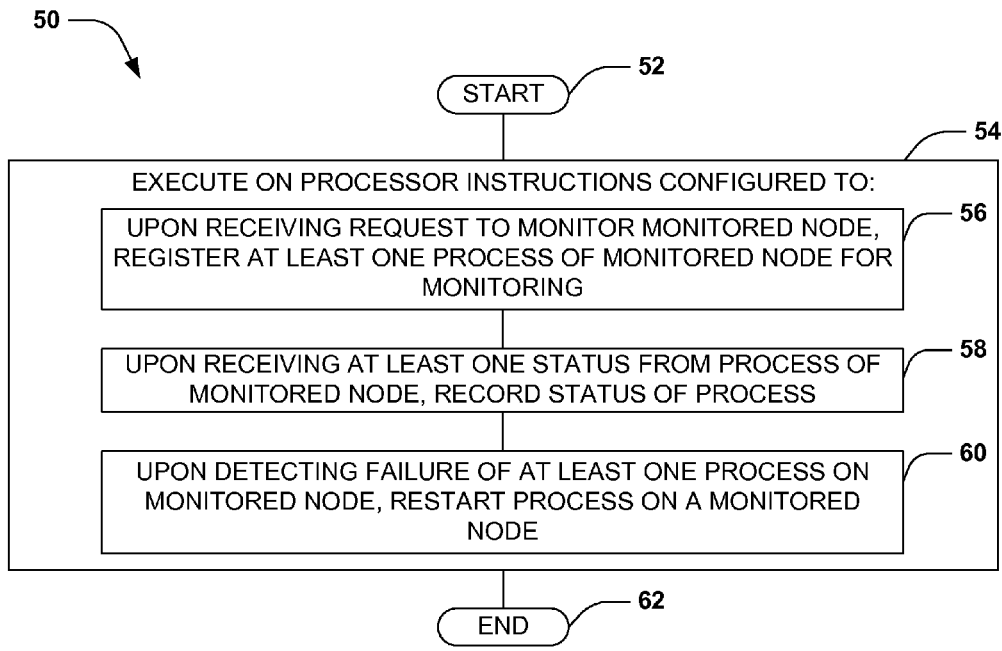
FIG. 3 is a flow chart illustrating an exemplary method of configuring a monitoring node to monitor one or more processes on one or more monitored nodes.

FIG. 3 presents a first embodiment of these techniques, illustrated as an exemplary method 50 of configuring a monitoring node 18 having a processor to monitor one or more monitored nodes 14 executing at least one process 16. The exemplary method 50 may be implemented, e.g., as a set of processor-executable instructions stored in a memory component of the monitoring node 18 (e.g., a memory circuit, a platter of a hard disk drive, a solid-state storage device, or a magnetic or optical disc) and configured in a such a manner as to, when executed by the processor of the monitoring node 18, cause the monitoring node 18 to perform the tasks of the exemplary method 50. The exemplary method 50 begins at 52 and involves executing 54 the instructions on the processor. In particular, the instructions are configured to, upon receiving a request to monitor a monitored node 14, register 56 at least one process 16 of the monitored node 14 for monitoring. The instructions are also configured to, upon receiving at least one status 42 from a process 16 of a monitored node 14, record 58 the status 42 of the process 16. The instructions are also configured to, upon detecting a failure of at least one process 16 of a monitored node 14, restart 60 the process 16 on a monitored node 14. In this manner, the exemplary method 50 causes the monitoring node 18 to perform fault detection and fault recovery of the processes 16 of one or more monitored nodes 14, and so ends at 62.

Figure 4:
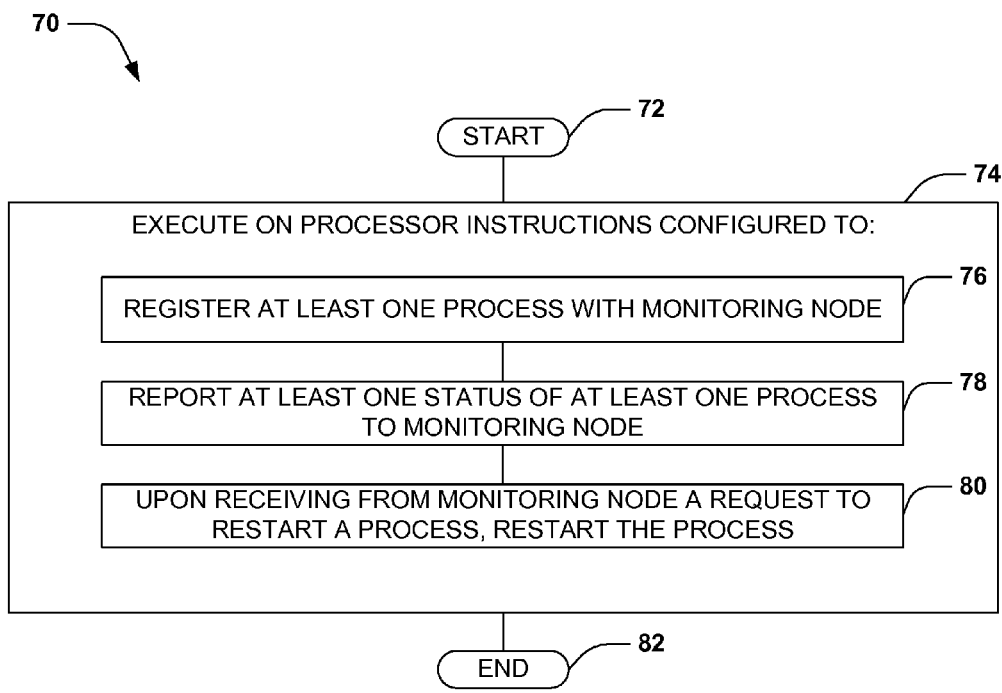
FIG. 4 is a flow chart illustrating an exemplary method of configuring a monitored node to participate in monitoring by one or more monitored nodes.

FIG. 4 presents a first embodiment of these techniques, illustrated as an exemplary method 70 of configuring a monitored node 14 having a processor and executing at least one process 16 to be monitored by a monitoring node 18. The exemplary method 70 may be implemented, e.g., as a set of processor-executable instructions stored in a memory component of the monitoring node 18 (e.g., a memory circuit, a platter of a hard disk drive, a solid-state storage device, or a magnetic or optical disc) and configured in a such a manner as to, when executed by the processor of the monitored node 14, cause the monitored node 14 to perform the tasks of the exemplary method 50. The exemplary method 70 begins at 72 and involves executing 74 the instructions on the processor. In particular, the instructions are configured to register 76 at least one process 16 with the monitoring node 18. The instructions are also configured to report 78 (e.g., periodically) at least one status 42 of at least one process 16 to a monitoring node 18. Additionally, the instructions are also configured to, upon receiving from a monitoring node 18 a request to restart a process 16, restart 80 the process 16. In this manner, the exemplary method 70 causes the monitored node 14 to enroll its processes 16 for monitoring by a monitoring node 18 and participate in the monitoring scenario according to the techniques presented herein, and so ends at 82.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
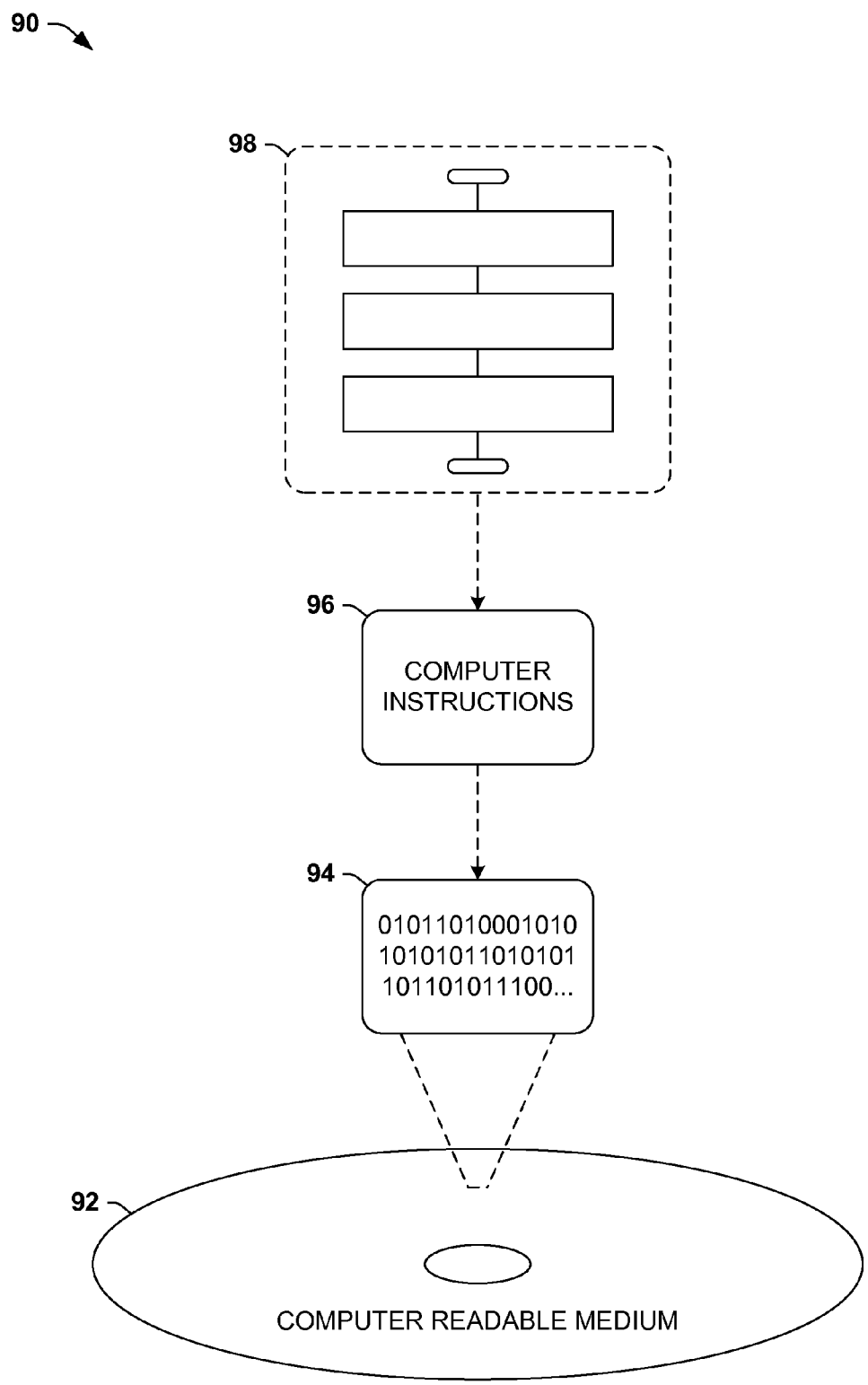
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of configuring a monitoring node to monitor one or more processes on one or more monitored nodes, such as the exemplary method 50 of FIG. 3. In another such embodiment, the processor-executable instructions 96 may be configured to implement a method of configuring a monitored node to participate in monitoring by one or more monitoring nodes, such as the exemplary method 70 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary method 70 of FIG. 4) to confer individual and/or synergistic advantages upon such embodiments.

A first aspect that may vary among embodiments relates to the scenarios wherein such embodiments may be utilized. As a first example, the monitoring techniques presented herein may be utilized to achieve the monitoring of many types of nodes, such as computers of various form factors (e.g., servers, workstations, consoles, notebooks, tablets, palmtop devices, and smartphones). As a second example, many types of processes 16 may be monitored according to the techniques presented herein, such as services (e.g., email servers, file servers, database servers, sensors, automation servers such as supervisory control and data acquisition (SCADA) components, and artificially intelligent processes. As a third example, many types of statuses 42 may be reported by such processes 16, including an "OK" status, a "not OK" status, an "encountering difficulties" status, and a "locked up" status. Those of ordinary skill in the art may envision many scenarios wherein the techniques presented herein may be utilized.

A second aspect that may vary among embodiments of these techniques relates to the configuration of the monitoring of a monitored node 14 performing at least one process 16. As a first example of this second aspect, a monitored node 14 and/or process 16 may be configured to send to the monitoring node 18 a series of persistence indicators that indicate the continued functionality of the monitored node 14 and/or process 16. The monitored node 14 and/or process 16 may be configured to send a persistence indicator to the monitoring node 18 within a notification period (e.g., once per minute), and a monitoring node may be configured to detect a failure of the monitored node 14 and/or process 16 as an elapsing of a notification period without having received the persistence indicator.

As a second example of this second aspect, in addition to reporting a status 42 (e.g., as a persistence indicator), a process 16 may be configured to report its state to the monitoring node 18, which may be configured to record the state of the process 16. For example, the process 16 may comprise a state machine that may exist in various states and/or one or more data items upon which the process 16 is operating, and the process 16 may periodically report the state and the data items to the monitoring node 18. This information may add detail to the reported status 42 of the process 16, and may be useful in the event of a subsequent failure of the process 16.

As a third example of this second aspect, a monitoring node 18 may be configured to take many types of actions upon detecting a failure of a monitored node 14 and/or process 16. As a first example, the monitoring node 18 may simply record the failure in a log 28, or may contact an administrator 12 with a notification of the failure. As a second example, the monitoring node 18 may request the monitored node 14 to restart a process 16 that has failed. Moreover, if the monitoring node 18 is monitoring a set of two or more monitored nodes 14, the monitoring node 18 may select a substitute monitored node 14, and may request the substitute monitored node 14 to restart the process 16. This substitution may be advantageous, e.g., if the monitored node 14 is also performing other processes 16 that may be disrupted by an additional failure of the process 16 upon restarting on the same monitored node 14, and/or for retrying the process 16 on a different monitored node 14 that may have different conditions that avoid a second failure of the process 16. Moreover, this substitution may be advantageous, e.g., when an entire monitored node 14 fails, and when all of the processes 16 that had been performed by the monitored node 14 are to be restarted on one or more substitute monitored nodes 14.

As a fourth example of this second aspect, if a process 16 is configured to report its state to a monitoring node 16, then upon detecting a failure of the process 16, the monitoring node 18 may request a restart of the process 16 on a monitored node 14 (including a substitute monitored node 14) in the state last reported by the process 16 before failure. For example, a process 16 may comprise an algorithm performing a lengthy computation (e.g., the processing of a large array), and may periodically report to the monitoring process 18 its state within the algorithm (e.g., the index into the array that is currently being processed). If the process 16 fails, the monitoring process 18 may request a monitored node 14 to restart the process 16 at the last reported state, such as the last reported position within the algorithm (e.g., beginning with the last reported array index within the array). In this manner, the process 16 may be restarted without having to perform the previously performed states, thereby reducing a redundant performance of the completed portion of the algorithm and conserving the computing resources in the performance of the process 16.

Figure 6:
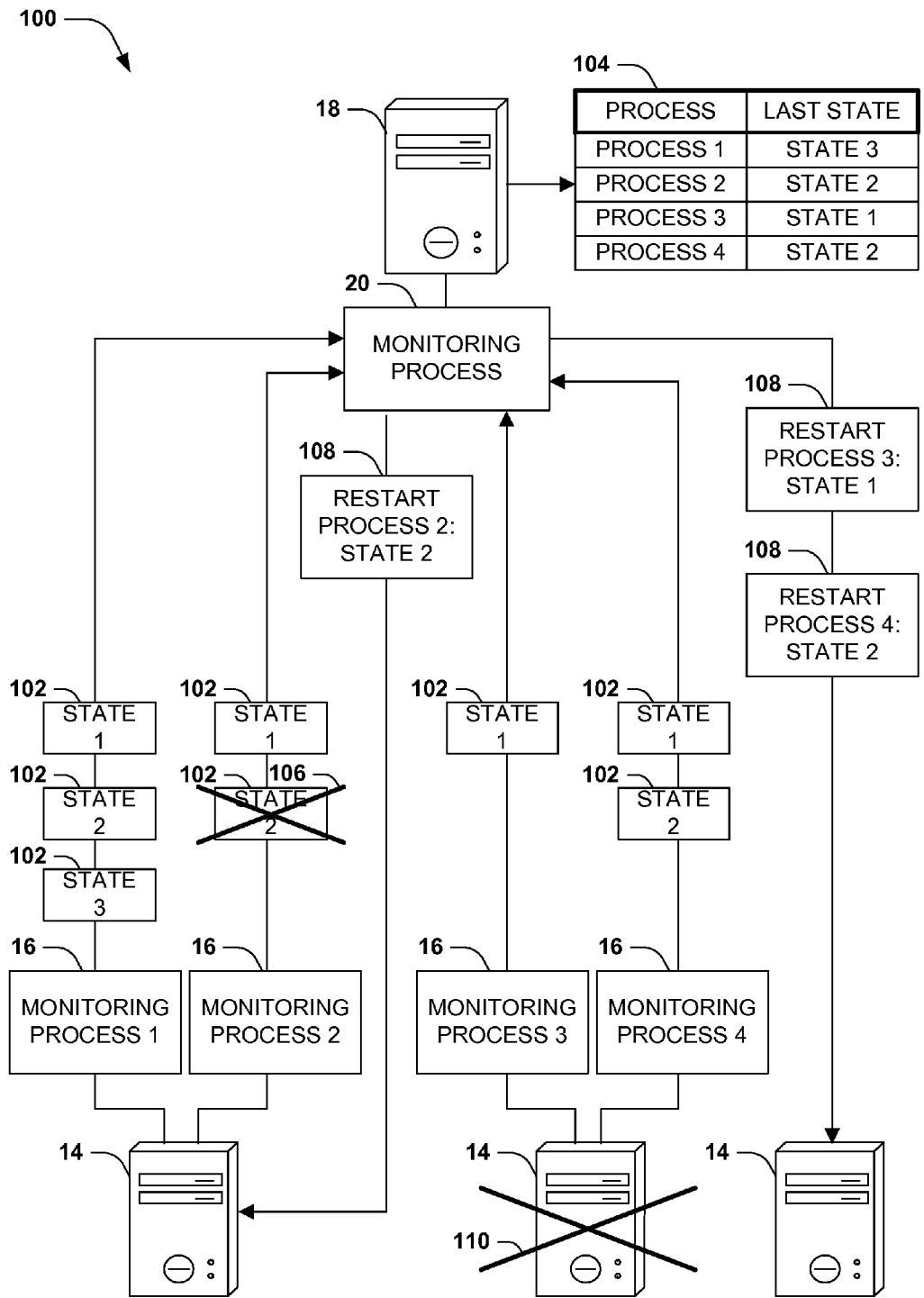
FIG. 6 is an illustration of an exemplary scenario featuring a monitoring node configured to monitor the states of processes of monitored nodes, and to handle a failure of a process or a monitored node.

FIG. 6 presents an illustration of an exemplary scenario 100 featuring a reporting to a monitoring node a set of states 102 of respective processes 16 performed by respective monitored nodes 14. In this exemplary scenario 100, two monitored nodes 14 are respectively performing two monitored processes 16 that are respectively configured to report the state 102 of the process 16 to the monitoring node 18. For example, the processes 16 may report the states 102 to the monitoring node 18 periodically, or upon transitioning from a first state 102 to a second state 102. The monitoring node 18 may record the states 102 of the processes 16 in a state log 104. Accordingly, if a second process 16 executing on the first monitored node 14 experiences a failure 106 (e.g., if the second process 16 crashes, reports a problem, or fails to continue reporting states 102 and/or statuses 42, such as performance indicators), the monitored node 18 may detect the failure 106 of the second process 16, and may send to the monitored node 14 a request 108 to restart the second process 16. Moreover, the monitoring node 18 may refer to the state log 104, identify the last state 102 reported by the second process 16 (e.g., the second process 16 may have reported a second state 102 and then crashed), the monitoring node 18 may indicate in the request 108 that the monitored node 14 is to restart the second process 16 in the second state 102. Similarly, a second monitored node 14 may be performing two processes 16, but may experience a failure 110 (e.g., may overheat, lose power or network connectivity, or exhibit an operating system crash). The monitoring node 18 may detect the failure 110 of the second monitored node 14, and may send to a third monitored node 14 a series of requests 108 to restart each of the processes 16 that the second monitored node 14 was performing at the time of the failure 110. Moreover, the monitoring node 18 may indicate in the request 108 the state 102 in which the third monitored node 14 is to restart each process 16, based on the states 102 of the processes 16 last reported before the failure 110. In this manner, the monitoring node 18 may instruct the monitored nodes 14 to restart the processes 16 according to the states 102 last reported prior to a failure, thereby conserving the computing resources of the processes 16 within the monitoring scenario.

As a fifth example of this second aspect, a monitoring node 18 may be configured to, upon detecting a failure of a process 16, take other actions in order to address the failure. For example, the monitoring node 18 may be configured to perform a particular logic (e.g., an invocation of a function or a set of instructions) when a process 16 enters a particular state 102 (e.g., when the process 16 raises a particular event). Moreover, the monitoring node 18 may receive the logic in advance from a monitored node 14 (e.g., during the registration of the monitored node 14 for monitoring) and/or process (e.g., when the monitored node 14 initiates a process 16 to be monitored by the monitoring node 18). For example, a monitored node 14 or process 16 may comprise a dynamic link library (DLL) including one or more functions, and may provide the library to the monitoring node 18 with a request to perform one or more of the functions if the process 16 enters a particular state 102. In this manner, a monitored node 14 may, while subscribing to a monitoring service, provide instructions to the monitoring node 18 to be performed in the event of a failure.

Figure 7:
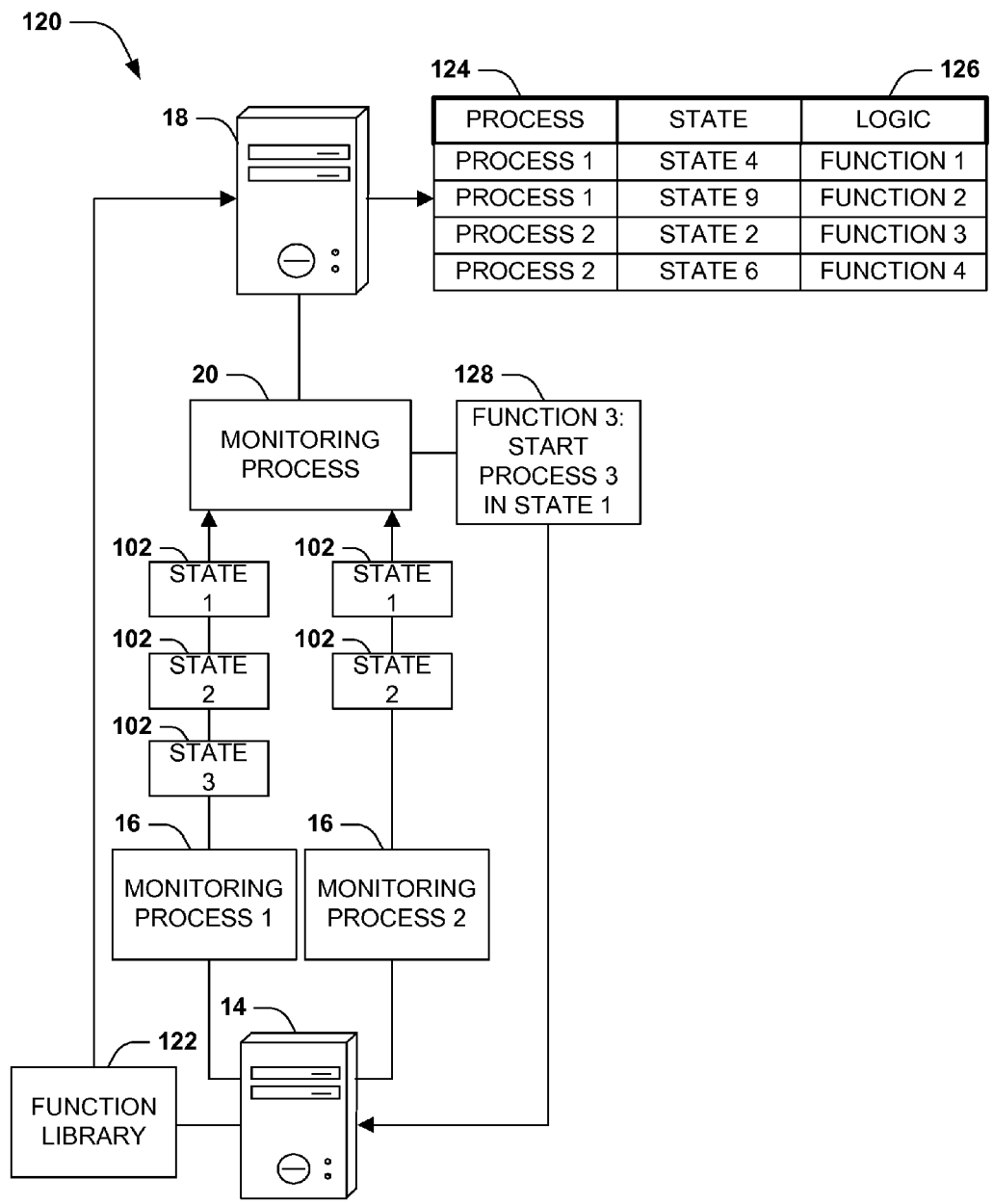
FIG. 7 is an illustration of an exemplary scenario featuring a monitoring node configured to perform a logic upon detecting that respective processes performed by a monitored node have entered a particular state.

FIG. 7 presents an illustration of an exemplary scenario 120 featuring monitoring node 18 configured to perform a logic 124 upon detecting a process 16 entering a particular state 102 (e.g., upon raising a particular event). In this exemplary scenario 120, the monitoring node 18 receives from the monitored node 14 (e.g., while the monitored node 14 registers with the monitoring node 18) a function library 122, such as a dynamic link library (DLL) or a script, comprising a set of executable functions, as well as a specification of which functions are to be invoked upon a particular process 16 entering a particular state 102. The monitoring process 18 may store this information, e.g., in a logic table 124 specifying a logic 126 to be performed upon a particular process 16 entering a particular state 102, and may refer to the logic table 124 whenever a state 102 reports entering a new state 102. Accordingly, in the exemplary scenario 120 of FIG. 7, when the second process 14 reports to the monitoring node 18 that it has entered a second state, the monitoring process 18 may refer to the logic table 102, determine that it is to perform a particular logic 126 in this event (e.g., invoking a third function of the function library 122), and may perform the logic, resulting in a request 128 to the monitored node 14 to start a third process 16 in a particular state 102 (e.g., a repair process that addresses the particular type of failure indicated by the state 102 reported by the second process 16). Those of ordinary skill in the art may devise many variations in the type of monitoring applied by a monitoring node 18 to a monitored node 14 and the processes 16 performed thereby in accordance with the techniques presented herein.

A third aspect that may vary among embodiments of these techniques relates to monitoring scenarios involving a set of monitoring nodes 18 that may provide additional features, such as improved fault tolerance and fault recovery, by interoperating to monitor the monitored nodes 14 and processes 16. As a first example, each monitoring node 18 of the monitoring node set may store the statuses 42 received from the processes 16 of respective monitored nodes 14, and may synchronize the statuses 42 with at least one other monitoring node 18. This synchronization may enable the monitoring nodes 18 to share information about the statuses 42 of the processes 16 and to remain up to date about the status of the components in the monitoring scenario.

As a second example of this third aspect, when a failure of a monitored node 14 is detected, the monitoring nodes 18 may confer to choose a substitute monitored node 14 for the failed monitored node 14. For example, a first monitoring node 18 may detect a failure of a monitored node 14, but a second monitoring node 18 may be in communication with a second monitored node 14 that is performing few or no processes 16, and the monitoring nodes 14 may confer to select the second monitored node 14 as the substitute node 14 for the failed monitored node 14. This conferring may therefore enable a load-balancing effect in the choosing of substitute monitored nodes 14 in the event of a failure.

As a third example of this third aspect, respective monitored nodes 14 may be assigned for monitoring by a particular monitoring node 18 of the monitoring node set. For example, when a monitored node 14 registers for monitoring, the monitoring node set may confer to choose a monitoring node 18 to which the monitored node 14 is to be assigned (e.g., by choosing a monitoring node 18 that is currently monitoring few or no other monitored nodes 14 and/or processes 16). When a process 16 of a monitored node 14 reports a status 42 or a state 102, the monitored node 14 may send the status 42 or state 102 to the monitoring node 18 to which the monitored node 14 has been assigned (rather than sending the status 42 or state 102 to many monitoring nodes 18, e.g., as a broadcast message). In this manner, the monitoring nodes 18 may perform a load-balancing among the monitoring nodes 18, and may conserve the network resources of the monitoring scenario by reducing the broadcasting of reports of statuses 42 and/or states 102.

As a fourth example of this third aspect, respective monitoring nodes 18 may be configured to monitor each other for failure, and to recover from such failure in a manner that does not disrupt the monitoring of the monitored nodes 14 and/or processes 16. For example, respective monitoring nodes 18 may be configured to send persistence indicators to each other within a notification period (e.g., one persistence indicator from each monitoring node 18 per minute), and if a first monitoring node 18 detects that a notification period has elapsed without a second monitoring node 18 sending a persistence indicator, the first monitoring mode 18 may detect a failure of the second monitoring node 18. Alternatively, the first monitoring node 18 may receive a failure indicator from a monitored node 14 regarding a second monitoring node to which the monitored node 14 is assigned, but that the monitored node 14 is unable to contact. A detected failure of a monitoring node 18 may also prompt the other monitoring nodes 18 to take various actions; e.g., the remaining monitoring nodes 18 may confer to choose a substitute monitoring node 18, and may reassign to the substitute monitoring node 18 the monitored nodes 14 formerly assigned to the failed monitoring node 18. This conferring may be performed via an election or consensus-building mechanism (e.g., a Paxos algorithm), where monitoring nodes 18 may nominate other monitoring nodes 18 as substitute monitoring nodes 18 for the failed monitoring node 18, and a tallying of votes among the monitoring nodes 18 may lead to a consensus and an election of a substitute monitoring node 18. The substitute monitoring node 18 may then contact the reassigned monitored nodes 14 to establish the reassignment. Moreover, if the failed monitoring node 18 has synchronized the statuses 42 and/or states 102 of the processes 16 of the reassigned monitored nodes 14, then the substitute monitoring node 18 may quickly and easily assume the role of the failed monitoring node 18. In this manner, the monitoring scenario may detect and recover from a failure of a monitoring node 18 without an interruption of monitoring service.

Figure 8:
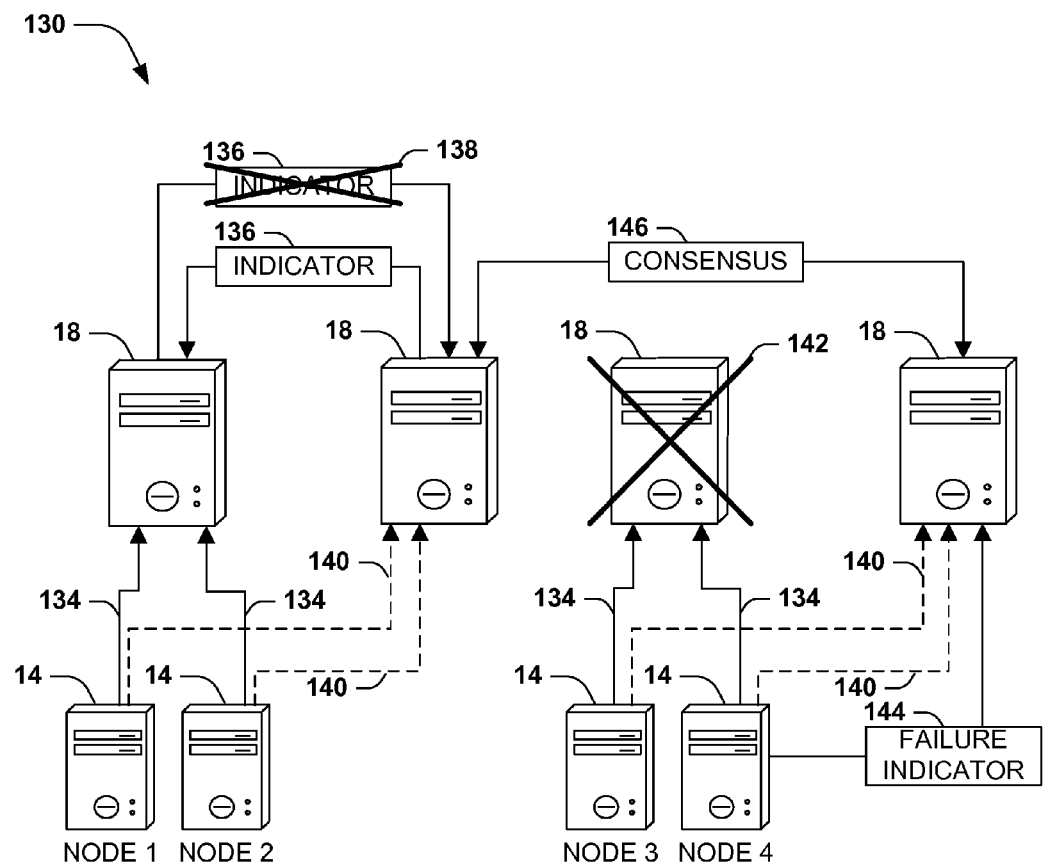
FIG. 8 is an illustration of an exemplary scenario featuring a set of monitoring nodes configured to monitor each other and to handle the failure of a monitoring node.

FIG. 8 presents an illustration of an exemplary scenario 130 featuring the detection of and recovery from failures of monitoring nodes 18 of a monitoring node set. In this exemplary scenario 130, respective monitoring nodes 14 of a monitored node set have assignments 134 for monitoring to a monitoring node set comprising four monitoring nodes 18. The monitoring nodes 18 may communicate in various ways to identify a failure, and may respond to detected failures in various ways. As a first example, a first monitoring node 18 and a second monitoring node 18 may periodically exchange persistence indicators 136 to indicate continued performance. However, when the first monitoring node 18 fails to send a persistence indicator 136 to the second monitoring node 18, the second monitoring node 14 may detect a failure 138 of the first monitoring node 18, and may initiate a reassignment 140 of the monitored nodes 14 to the second monitoring node 18. As a second example, a third monitoring node 18 may have assignments 134 to a set of monitored nodes 14, but one such monitored node 14 may detect a failure 142 of the third monitoring node 18 (e.g., an inability to contact the monitoring node 18 while sending a status 42 or state 102). The third monitoring node 18 may contact a fourth monitoring node 18 with a failure indicator 144. The fourth monitoring node 18 may confer with the remaining monitoring nodes 18 of the monitoring node set (e.g., the second monitoring node 18), and may negotiate a consensus 146 for a substitute monitoring node 18 to assume the role of the failed third monitoring node 18; and upon being elected the substitute monitoring node 18, the fourth monitoring node 18 may initiate a reassignment 140 of the monitored nodes 14 to the fourth monitoring node 18. In this manner, the monitoring nodes 18 of the monitoring node set may collaborate to detect and recover from failures among the monitoring nodes 18 of the monitoring node set. Those of ordinary skill in the art may devise many ways of configuring the monitoring nodes 18 of a monitoring node set in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
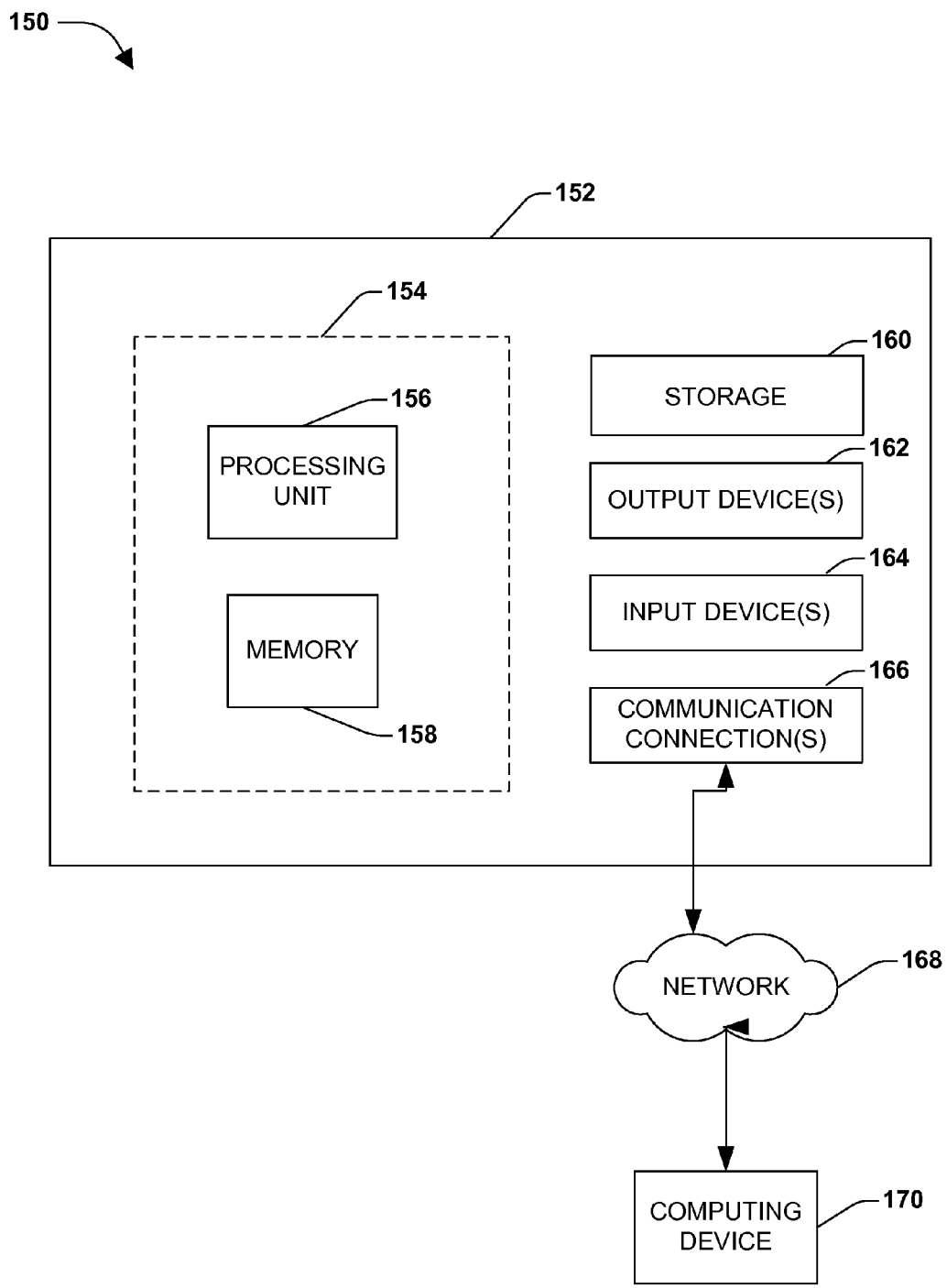
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 150 comprising a computing device 152 configured to implement one or more embodiments provided herein. In one configuration, computing device 152 includes at least one processing unit 156 and memory 158. Depending on the exact configuration and type of computing device, memory 158 may be volatile (such as RAM, for example), non-volatile (such as ROM, flash memory, etc., for example) or some combination of the two. This configuration is illustrated in FIG. 9 by dashed line 154.

In other embodiments, device 152 may include additional features and/or functionality. For example, device 152 may also include additional storage (e.g., removable and/or non-removable) including, but not limited to, magnetic storage, optical storage, and the like. Such additional storage is illustrated in FIG. 9 by storage 160. In one embodiment, computer readable instructions to implement one or more embodiments provided herein may be in storage 160. Storage 160 may also store other computer readable instructions to implement an operating system, an application program, and the like. Computer readable instructions may be loaded in memory 158 for execution by processing unit 156, for example.

The term "computer readable media" as used herein includes computer storage media. Computer storage media includes volatile and nonvolatile, removable and non-removable media implemented in any method or technology for storage of information such as computer readable instructions or other data. Memory 158 and storage 160 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 152. Any such computer storage media may be part of device 152.

Device 152 may also include communication connection(s) 166 that allows device 152 to communicate with other devices. Communication connection(s) 166 may include, but is not limited to, a modem, a Network Interface Card (NIC), an integrated network interface, a radio frequency transmitter/receiver, an infrared port, a USB connection, or other interfaces for connecting computing device 152 to other computing devices. Communication connection(s) 166 may include a wired connection or a wireless connection. Communication connection(s) 166 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 152 may include input device(s) 164 such as keyboard, mouse, pen, voice input device, touch input device, infrared cameras, video input devices, and/or any other input device. Output device(s) 162 such as one or more displays, speakers, printers, and/or any other output device may also be included in device 152. Input device(s) 164 and output device(s) 162 may be connected to device 152 via a wired connection, wireless connection, or any combination thereof. In one embodiment, an input device or an output device from another computing device may be used as input device(s) 164 or output device(s) 162 for computing device 152.

Components of computing device 152 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 152 may be interconnected by a network. For example, memory 158 may be comprised of multiple physical memory units located in different physical locations interconnected by a network.

Those skilled in the art will realize that storage devices utilized to store computer readable instructions may be distributed across a network. For example, a computing device 170 accessible via network 168 may store computer readable instructions to implement one or more embodiments provided herein. Computing device 152 may access computing device 170 and download a part or all of the computer readable instructions for execution. Alternatively, computing device 152 may download pieces of the computer readable instructions, as needed, or some instructions may be executed at computing device 152 and some at computing device 170.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of configuring a first monitoring node having a processor to monitor monitored nodes executing at least one process, the first monitoring node included in a monitoring node set comprising at least one other monitoring node, respective monitoring nodes assigned to monitor a monitored node subset, the method comprising:
responsive to receiving from a monitored node a request for the first monitoring node to monitor at least one process executing on the monitored node:
adding the monitored node to the monitored node subset assigned to the first monitoring node; and
registering the at least one process of the monitored node for monitoring;
responsive to receiving from the monitored node a logic set associating, for respective states of a process executing on the monitored node, a logic to be performed responsive to the monitored node reporting the state, store the logic set in association with the respective states of the monitored node;
after storing the logic set and responsive to detecting that the process of the monitored node has entered a selected state, perform, at the first monitoring node and on behalf of the monitored node, the logic associated with the selected state of the process in the logic set of the monitored node; and
responsive to detecting a failure of at least one process of the monitored node, restarting the process.

2. The method of claim 1:
at least one monitored node configured to send to the monitoring node, within a notification period, a persistence indicator; and
detecting a failure comprising: detecting an elapsing of a notification period without having received a persistence indicator from the monitored node.

3. The method of claim 1:
the first monitoring node monitoring at least two monitored nodes; and
restarting at least one process on a monitored node comprising:
selecting a substitute monitored node, and
restarting at least one process of the monitored node on the substitute monitored node.

4. The method of claim 3:
detecting a failure of at least one process of a monitored node comprising: detecting a failure of a monitored node; and
restarting the least one process on the monitored node comprising: restarting all processes of the monitored node on the substitute monitored node.

5. The method of claim 1:
at least one process of a monitored node configured to report to the first monitoring node at least one state of at least one process; and
the method further comprising: responsive to receiving a report of a state of at least one process reported by a monitored node, storing the state of the process.

6. The method of claim 5, restarting a process on a monitored node comprising: restarting the process on a monitored node at the state last reported by the process.

7. The method of claim 1:
the monitoring nodes of the monitoring node set configured to store at least one status of at least one monitored node; and
the method further comprising: synchronizing the at least one status of at least one monitored node with at least one other monitoring node of the monitoring node set.

8. The method of claim 1:
detecting a failure of at least one process of a monitored node comprising: detecting a failure of a monitored node; and
restarting the least one process on the monitored node comprising: conferring with at least one other monitoring node of the monitoring node set to choose a substitute monitored node for the monitored node.

9. The method of claim 1, respective monitored nodes assigned for monitoring by at least one monitoring node of the monitoring node set.

10. The method of claim 9, registering at least one process of a monitored node for monitoring comprising: conferring with at least one other monitoring node of the monitoring node set to choose a monitoring node for monitoring the monitored node.

11. The method of claim 1, further comprising:
the failed monitoring node configured to send to the monitoring node, within a notification period, a persistence indicator; and
responsive to detecting an elapsing of a notification period without having received a persistence indicator from the failed monitoring node:
removing the failed monitoring node from the monitoring node set;
among the monitoring nodes of the monitoring node set, choosing a substitute monitoring node; and
reassigning the monitored node subset of the failed monitoring node to the substitute monitoring node.

12. The method of claim 1, further comprising: responsive to receiving from a monitored node a failure indicator of a failed monitoring node:
removing the failed monitoring node from the monitoring node set;
among the monitoring nodes of the monitoring node set, choosing a substitute monitoring node; and
reassigning the monitored node subset of the failed monitoring node to the substitute monitoring node.

13. The method of claim 1, further comprising: responsive to detecting a failure of a failed monitoring node of the monitoring node set:
removing the failed monitoring node from the monitoring node set;
conferring with at least one other monitoring node of the monitoring node set to choose a substitute monitoring node for the monitored node; and
reassigning the monitored node subset of the failed monitoring node to the substitute monitoring node.

14. The method of claim 1, further comprising: responsive to detecting a failure of a failed monitoring node of the monitoring node set:
removing the failed monitoring node from the monitoring node set;
among the monitoring nodes of the monitoring node set, choosing a substitute monitoring node;
reassigning the monitored node subset of the failed monitoring node to the substitute monitoring node; and
sending to the monitoring nodes of the monitored node subset a reassignment notification that identifies the substitute monitoring node for the monitored node.

15. The method of claim 1, further comprising: responsive to detecting a failure of a failed monitoring node of the monitoring node set:
removing the failed monitoring node from the monitoring node set;
among the monitoring nodes of the monitoring node set, choosing a substitute monitoring node; and
reassigning the monitored node subset of the failed monitoring node to the substitute monitoring node.

16. The method of claim 1, wherein:
the logic set provided by the monitored node specifies a failure logic to be performed responsive to detecting a failure of the monitored node; and
the method further comprises: responsive to detecting a failure of a failed monitoring node, perform the failure logic associated with the failure of the monitored node in the logic set.

17. A method of configuring a monitored node executing at least one process on a processor to be monitored by a monitoring node set, the method comprising:
responsive to receiving a notification of an assignment of the monitored node to a first monitoring node of the monitoring node set:
setting the first monitoring node as a selected monitoring node, and
sending to the first monitoring node a logic set associating, for respective states of a process executing on the monitored node, a logic to be performed by the monitoring node responsive to the monitored node reporting the state;
sending to the selected monitoring node a request to register at least one process executing on the monitored node for monitoring by the monitoring node;
after sending the logic set to the first monitoring node, reporting the state of the process to the monitoring node, wherein the state reported to the monitoring node is associated with a selected logic of the logic set that is to be performed by the monitoring node on behalf of the monitored node; and
responsive to receiving from the selected monitoring node a request to restart a process, restarting the process.

18. The method of claim 17, further comprising: responsive to detecting a failure of the selected monitoring node, notifying at least one other monitoring node of the monitoring node set of the failure of the selected monitoring node.

19. A computer-readable storage device comprising instructions that, when executed on a processor of a first monitoring node included in a monitoring node set comprising at least one other monitoring node, cause the first monitoring node to monitor at least one monitored node, by:
responsive to receiving from at least one monitored node a request for at least one monitored process executing on the monitored node to be monitored by the device:
adding the monitored node to the monitored node subset assigned to the monitoring node; and
initiating monitoring of the at least one process of the monitored node for monitoring;
responsive to receiving from the monitored node a logic set associating, for respective states of at least one process executing on the monitored node, a logic to be performed upon the process entering the state, store the logic set in association with the respective state of the monitored node;
after storing the logic set and responsive to detecting a process status and a state of the at least one monitored process of the at least one monitored node, perform, at the first monitoring node and on behalf of the monitored node, the logic associated in the logic set with the state of the monitored process of the monitored node; and
responsive to detecting, for a selected monitored process of a monitored node, the selected monitored process having a process state, a status indicating a failure of the selected monitored process, requesting a selected monitored node to restart the selected monitored process with the process state.

20. The computer-readable storage device of claim 19, executing the instructions further causing the device to, responsive to detecting a failure of a failed monitoring node of the monitoring node set:
- removing the failed monitoring node from the monitoring node set;
- among the monitoring nodes of the monitoring node set, choosing a substitute monitoring node;
- reassigning the monitored node subset of the failed monitoring node to the substitute monitoring node; and
- sending to the monitoring nodes of the monitored node subset a reassignment notification that identifies the substitute monitoring node for the monitored node.

* * * * *